Aug. 12, 1947.   C. J. McCOY   2,425,292
PIPE HANDLING APPARATUS
Filed Dec. 11, 1945   2 Sheets-Sheet 1
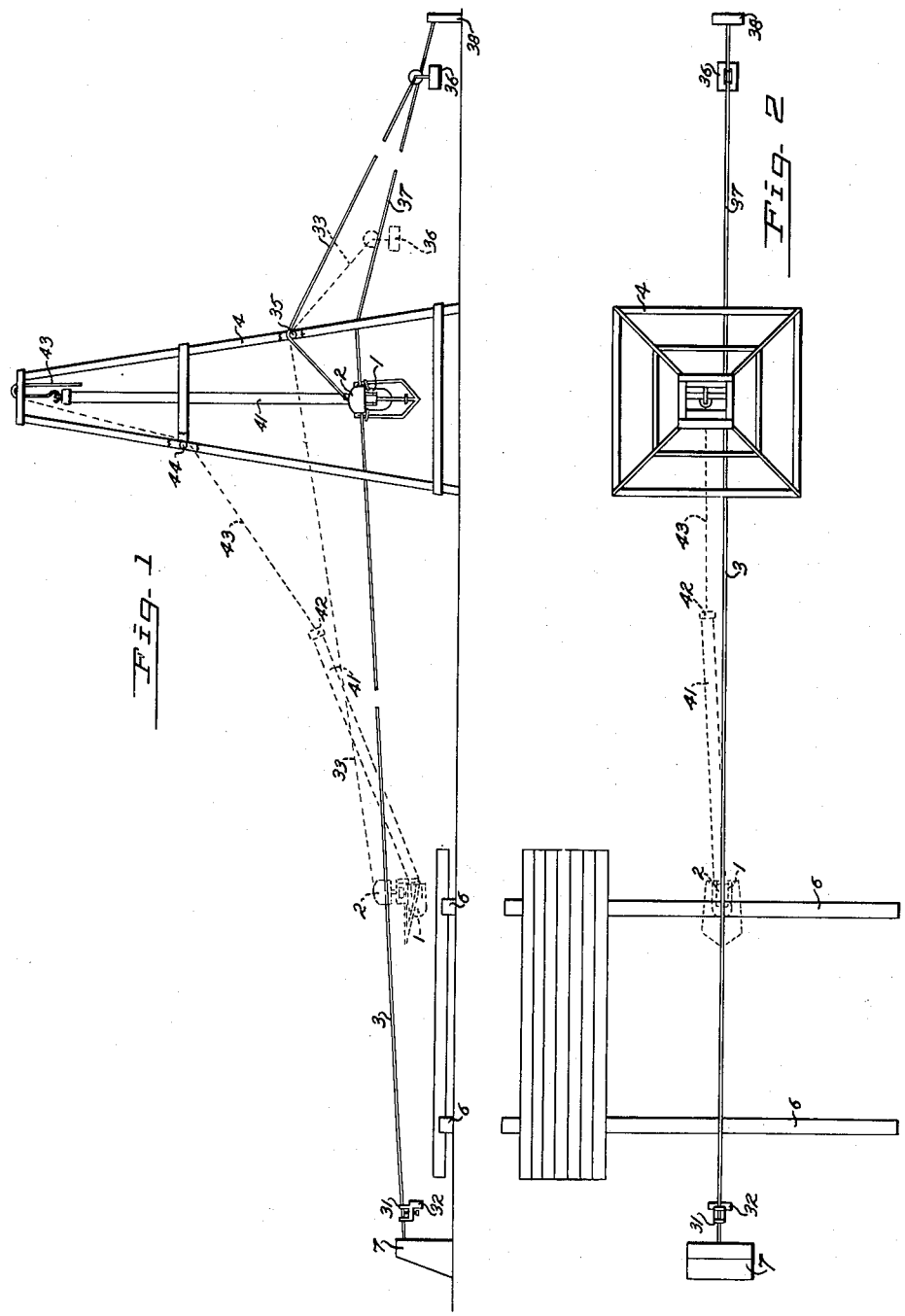
INVENTOR
CARL J. MCCOY
BY
Charles S. Evans
ATTORNEY Aug. 12, 1947.  C. J. McCOY  2,425,292
PIPE HANDLING APPARATUS
Filed Dec. 11, 1945   2 Sheets-Sheet 2
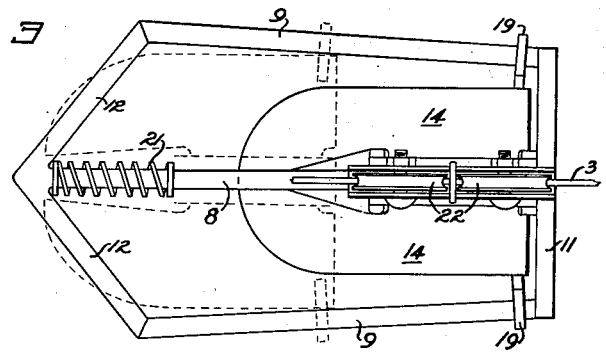
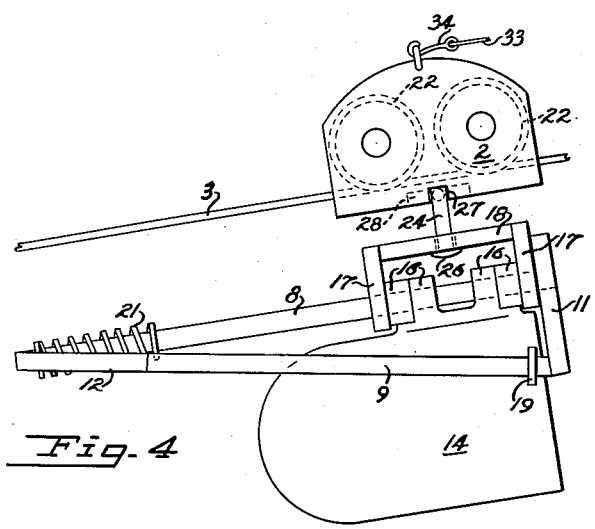
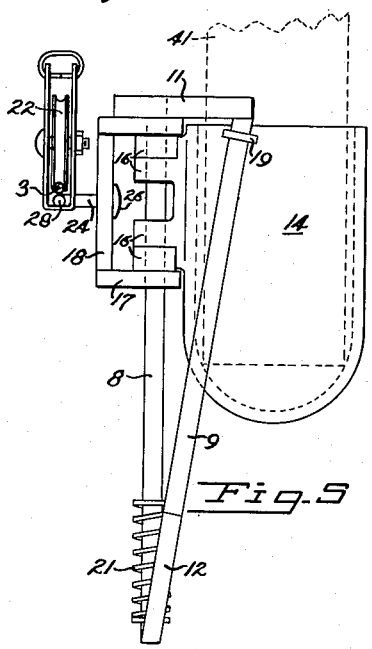
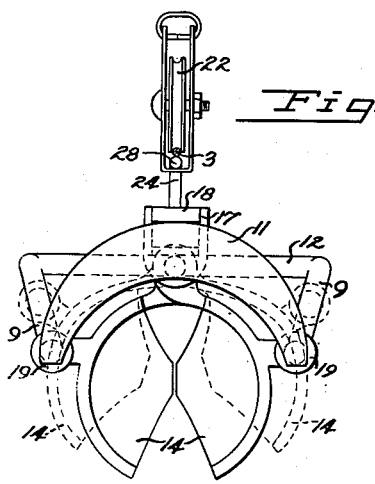
INVENTOR
CARL J. MCCOY.
BY
Charles S. Evans
ATTORNEY Patented Aug. 12, 1947

2,425,292

UNITED STATES PATENT OFFICE 2,425,292

PIPE HANDLING APPARATUS

Carl J. McCoy, Orcutt, Calif.

Application December 11, 1945, Serial No. 634,242

3 Claims. (Cl. 214—1)

My invention relates to apparatus for handling pipe, and particularly for laying lengths of well pipe upon a rack for temporary storage after they are withdrawn from a well.

In the drilling and maintenance of oil wells, it is at times necessary to withdraw some or all of the casing, drill pipe, or tubing. This is accomplished by hoisting the whole string bodily to permit the uppermost lengths to be disconnected and placed on a storage rack located at any available area near the well. The spring is raised, and the lengths are disconnected and laid upon the rack successively for temporary storage until they are returned to the well or otherwise disposed of. The lengths are heavy and unwieldy; and the labor cost of handling the pipe and laying it on the storage rack has been very high.

It is among the objects of my present invention to provide an apparatus for handling and laying down well pipe which will facilitate the work; and which will materially reduce the number of workmen required for the work, and hence the labor costs.

Another object is to provide an apparatus for gripping a length of well pipe while suspended in a well derrick and conveying it by gravity along a trolley line to a storage rack spaced from the derrick.

Another object is to provide a well handling apparatus in which the weight of a length of pipe aids in maintaining gripping engagement by a pipe grip during movement along a trolley line, and in which the weight and momentum of the pipe supplies the force by which the pipe is automatically released at a predetermined delivery point.

Another object is to provide a pipe grip of rugged construction, in which the jaws are positively guided to gripping and releasing positions, and which is simple and efficient in its operation.

A further object is to provide an apparatus of the character described which includes means for automatically returning the pipe grip to its pipe receiving station after releasing a preceding pipe length at a delivery station.

The invention possesses other valuable features, some of which with the foregoing will be set forth at length in the following description where that form of the invention which has been selected for illustration in the drawings accompanying and forming a part of the present specification is explained. In said drawings, one form of the invention is shown, but it is to be understood that it is not limited to that form, since the invention as set forth in the claims may be embodied in a plurality of forms.

In the drawings:

Figure 1 is a semi-diagrammatic side elevation of the apparatus as installed in connection with a well derrick and storage rack, parts being broken away.

Figure 2 is a plan view of the installation illustrated in Figure 1.

Figure 3 is a plan view of the trolley and pipe grip.

Figure 4 is a side elevation of the trolley and pipe grip.

Figure 5 is an elevational view showing the pipe grip swung to pipe receiving position.

Figure 6 is a right end elevation of the parts as shown in Figure 4, the pipe releasing position of the jaws being indicated in dotted lines.

In terms of broad inclusion the pipe handling apparatus of my invention comprises a pipe grip carried by a trolley mounted for movement along a trolley line from a well derrick to a rack for storing lengths of pipe withdrawn from the well. The grip is arranged to be swung to an upwardly faced position at one side of the trolley line to grip the lower end of a length of pipe suspended on the derrick by a cable which may be paid out to lower the pipe length. The lower end of the pipe is carried by gravity outwardly along the trolley line to a delivery point where the length is laid down upon the rack. The invention contemplates the provision of a stop against which the pipe grip is moved with sufficient momentum to cause the grip to automatically disengage the pipe; and also contemplates a counterweight for automatically returning the grip along the trolley line after the pipe is released, for receiving a succeeding length of pipe.

In terms of greater detail, the pipe handling apparatus of my invention comprises a pipe grip, designated in general by the numeral 1, carried by a trolley 2 which is movable along a trolley line 3. The trolley line 3 is preferably a cable anchored at one end to a well derrick 4 and inclining downwardly from the derrick past a rack 6 to an anchorage 7. The rack preferably comprises a pair of spaced rails, which may advantageously incline away from the trolley line 3.

The pipe grip 1 comprises a carriage frame having a central shaft 8; and a pair of guide bars 9, positioned to incline upwardly and to diverge outwardly from front to back of the carriage. At their forward ends, the shaft 8 and guide bars 9 are secured to an arch-shaped cross-piece 11. At the rearward end, portions 12 of the guides are bent to converge and meet with the shaft 8 at a common point where they are welded or otherwise secured together.

A pair of pipe gripping jaws 14 are provided with apertured lugs 16 through which the shaft 8 extends. The lugs 16 of one jaw interfit with the lugs of the other jaw; and the interfitting lugs of the two jaws are engaged between the arms 17 of a yoke 18 mounted for sliding movement along the shaft 8. Lugs 19 on the sides of the jaws 14 slidingly engage the guide bars 9. The lugs 19 are so positioned, and the bars 9 so inclined and angularly disposed with respect to the shaft 8, as to swing the jaws to pipe engaging relation when moved to the front of the carriage, and to spread the jaws to pipe releasing relation as the lugs 19 engage the rearward portions of the guide rods. A coil spring 21 mounted over the shaft 8 resiliently limits the relative axial movement of the shaft 8 and yoke 18.

The trolley 2 comprises a sheave on which are journaled one or more supporting pulleys 22 for engaging the trolley line 3. I prefer to use a pair of pulleys 22 arranged in tandem, in order to resist twisting movement such as might cause a single pulley to be displaced from the line. The sheave preferably extends under the trolley line 3 to prevent displacement of the pulleys 22 from the line, and to facilitate attachment of the carriage frame to the trolley.

The yoke 18 is attached to the sheave portion of the trolley 2 by means of a pivot pin 24, normally extending vertically downwardly from the trolley 2 in substantially vertical perpendicular relation to the trolley 2 and trolley line 3. The yoke 18 is rotatably supported on the lower end of the pin 24, and is held thereon by a head 26. At its upper end the pin 24 extends through a slot 27 in the bottom of the trolley sheave, and is secured to a pivot shaft 28 rotatably engaged by the sheave. The slot 27 is of a depth sufficient to permit the pin 24 and the carriage and pipe grip carried thereon to be turned through at least 90° to one side of the trolley and trolley line, and preferably through 90° to either side.

A stop 31 is secured to the trolley line 3 at a predetermined point for limiting the movement of the trolley 2 and its attached pipe grip outwardly along the trolley line 3. The stop may be a clamp of any construction, and is provided with a depending extension 32 against which the rearward end of the carriage may strike as it is moved outwardly along the trolley line.

Preferably a line 33 is attached to the trolley 2 by a hook 34 or other suitable means. The line 33 is carried over a suitable guide roller 35 on the derrick 4 to a counterweight 36 movable along a trolley line 37 inclining downwardly from the derrick to an anchorage 38. The line 37 may be a continuation of the trolley line 3. The counterweight is designed to outweigh the trolley 2 with its pipe grip and carriage, so as to automatically move the unloaded trolley to the derrick. When loaded with a length of pipe, the weight of the pipe exceeds the weight of the counterbalance, which will be displaced along the trolley line 37 an amount corresponding to the distance moved by the trolley 2 along the trolley line 3.

In operation, the upper length 41 of a string of well casing, drill pipe or tubing, is raised from the well in the ordinary manner; and is held while the length is uncoupled from the string. The uncoupled length is held in suspended position on the derrick by means of a clamp 42 to which a cable 43 is attached. The pipe grip, moved by the trolley 2 to the derrick 4 by the counterweight 36, is turned toward one side and swung to upwardly faced pipe receiving position, as indicated in Figures 1 and 5 of the drawings. In this position the lower end of the pipe length 41 is swung into position to be engaged by the jaws 14. The yoke 18 and jaws 14 are moved manually into alignment with the pipe 41; and, by raising the carriage relative to the jaws 14 and yoke 18, the jaws are swung open to receive the end of the pipe. As the jaws embrace the pipe end, the carriage is released and its weight causes the jaws 14 to close around the pipe.

The cable 43 is then paid out to lower the pipe length 41. As the pipe is lowered, the initial movement causes the carriage to swing under the trolley 2; and as more cable is paid out, the lower end of the pipe is carried outwardly along the trolley line 3. From a substantially vertical suspended position within the derrick at the start, the pipe is inclined at a progressively smaller angle until it reaches a substantially horizontal position as it reaches a delivery position over the rack rails 6. The cable 43 may be guided in any convenient way, as by a guide roller 44 upon the derrick 4, if desired.

As the pipe 41 reaches its delivery position, the carriage frame strikes the stop 31. The weight and momentum of the pipe and carriage causes the yoke 18 and jaws 14 to be forced rearwardly along the shaft 8. During this movement, the lugs 19, following the inclined and diverging guide bars 9, cause the jaws 14 to be swung apart to pipe releasing positions. As the pipe is disengaged, as indicated in Figure 6, the pipe drops onto the rack rails 6. The cable 43 is then released from the pipe 41, and is reeled in for attachment to the next succeeding pipe length. At the same time, the trolley 2, with its carriage and pipe grip, is automatically returned to the derrick by the counterweight 36, for attachment to the succeeding pipe length. The released pipe length is rolled along the rails to make room for the next pipe length.

The rack 6 may be positioned at any available location within reasonable proximity to the well, and may be made of a length such as to accommodate all of the casing, pipe and/or tubing which may have to be withdrawn from the well.

While the jaws 14 have been described as effecting a gripping engagement with the pipe, a firm gripping action is not necessary, and the end of a pipe length may seat loosely between the closed jaws which provide a basket in which the end of the pipe may be supported without actual gripping action. The jaws 14 are preferably of a size suitable for handling all of the sizes of casing, pipe or tubing normally used in a well.

I claim:

1. A grip for pipe handling apparatus comprising a carriage having a jaw mounting shaft, guide arms upon opposite sides of the shaft in spaced angularly disposed relation thereto, a yoke mounted upon the shaft for sliding and pivotal movement thereon, a pair of jaw members pivoted on the shaft between the yoke arms and slidably movable along the shaft with the yoke, means carried by the jaws engaging the guide arms for imparting pivotal movement to the jaws in response to relative movement of the jaws and shaft longitudinally of the shaft, a sheaved pulley for mounting the carriage on a trolley line, and means connecting the yoke and the sheave for pivotal movement about an axis substantially parallel to the trolley line and also about an axis substantially normal thereto.

2. A grip for pipe handling apparatus comprising a carriage having a jaw mounting shaft, guide arms upon opposite sides of the shaft in spaced angularly disposed relation thereto, a yoke mounted upon the shaft for sliding and pivotal movement thereon, a pair of jaw members pivoted on the shaft between the yoke arms and slidably movable along the shaft with the yoke, means carried by the jaws engaging the guide arms for imparting pivotal movement to the jaws in response to relative movement of the jaws and shaft longitudinally of the shaft, a sheaved pulley for mounting the carriage on a trolley line, means connecting the yoke and the sheave for pivotal movement about an axis substantially parallel to the trolley line and also about an axis substantially normal thereto, and resilient means for limiting relative movement of the jaws and jaw mounting shaft in the jaw releasing direction.

3. A grip for pipe handling apparatus comprising a carriage provided with jaws movable relative to the carriage for engaging and disengaging a length of pipe, a wheeled trolley for mounting the carriage for movement along a trolley line, and means connecting the carriage and trolley including a pivot pin substantially perpendicular to the trolley line for rotatably supporting the carriage, the pivot pin being pivotally movable relative to the trolley about an axis substantially parallel to the trolley line.

CARL J. McCOY.

REFERENCES CITED

The following references are of record in the file of this patent:

UNITED STATES PATENTS

| Number | Name | Date |
|---|---|---|
| 890,306 | Schmertz | June 9, 1908 |
| 1,144,387 | Skelton | June 29, 1915 |
| 1,596,733 | Higgins | Aug. 17, 1927 |
| 1,829,879 | Stephens | Nov. 3, 1931 |
| 2,113,270 | Hall et al. | Apr. 5, 1938 |
| 2,167,045 | Hooper | July 25, 1939 |
| 2,201,813 | Doud | May 21, 1940 |